(12) United States Patent
Huang et al.

(10) Patent No.: US 10,363,991 B2
(45) Date of Patent: Jul. 30, 2019

(54) TORQUE SENSOR SYSTEM FOR PEDELEC

(71) Applicant: NEW ANANDA DRIVE TECHNIQUES(SHANGHAI) CO., LTD., Shanghai (CN)

(72) Inventors: Hongyue Huang, Shanghai (CN); Jian Xu, Shanghai (CN); Weifang Shu, Shanghai (CN); Da Zhuo, Shanghai (CN)

(73) Assignee: NEW ANANDA DRIVE TECHNIQUES(SHANGHAI) CO., LTD., Shanghai (CN)

( * ) Notice: Subject to any disclaimer, the term of this patent is extended or adjusted under 35 U.S.C. 154(b) by 121 days.

(21) Appl. No.: 15/540,488

(22) PCT Filed: Dec. 17, 2015

(86) PCT No.: PCT/CN2015/097752
§ 371 (c)(1),
(2) Date: Jun. 28, 2017

(87) PCT Pub. No.: WO2016/107423
PCT Pub. Date: Jul. 7, 2016

(65) Prior Publication Data
US 2017/0361898 A1    Dec. 21, 2017

(30) Foreign Application Priority Data
Dec. 29, 2014  (CN) .......................... 2014 1 0848722

(51) Int. Cl.
*B62M 6/50*   (2010.01)
*B62M 11/14*  (2006.01)
*G01L 3/14*   (2006.01)

(52) U.S. Cl.
CPC .............. *B62M 6/50* (2013.01); *B62M 11/14* (2013.01); *G01L 3/1407* (2013.01); *G01L 3/1471* (2013.01)

(58) Field of Classification Search
None
See application file for complete search history.

(56) References Cited

U.S. PATENT DOCUMENTS 8,646,560 B2 *  2/2014  Chan ........................ B62M 6/50
                                                180/206.3

FOREIGN PATENT DOCUMENTS

CN           203142960 U  *  8/2013

* cited by examiner

*Primary Examiner* — Peter J Macchiarolo
*Assistant Examiner* — Jermaine L Jenkins

(57) ABSTRACT

A torque sensor system for a pedelec includes an annular gear (6), a planetary gear train (5), a sun gear output shaft (2), a pressure conversion device (9) and a signal processing component (8). The annular gear (6), the planetary gear train (5), and the sun gear output shaft (2) are engaged in turn. The annular gear (6) is driven by the planetary gear train (5), and an applied force signal is transmitted to the signal processing component (8) via the pressure conversion device (9) at an edge of the annular gear (6). The applied force signal is converted to an electric signal by the signal processing component (8) and transmitted to a controller, so as to realize a torque feedback. As a result, a problem that a speed sensor is not applicable to a pedelec when climbing is solved; and a user will feel real and comfortable when riding.

9 Claims, 4 Drawing Sheets

A-A
(1:2)

A-A
(1:2)

TORQUE SENSOR SYSTEM FOR PEDELEC

CROSS REFERENCE OF RELATED APPLICATION

This is a U.S. National Stage under 35 U.S.C 371 of the International Application PCT/CN2015/097752, filed Dec. 17, 2015, which claims priority under 35 U.S.C. 119(a-d) to CN 201410848722.2, filed Dec. 29, 2014.

BACKGROUND OF THE PRESENT INVENTION

Field of Invention

The present invention relates to a torque sensor system, and in particular to a torque sensor system for a pedelec.

Description of Related Arts

A pedelec refers to a mechatronic vehicle on the basis of ordinary small cars, and the mechatronic vehicle takes an accumulator as the auxiliary energy with installation of motor, controller, accumulator, turning handle, brake handle and other control assembly, and display instrument system. The widespread pedelec is equipped with a speed sensor; as the speed signal is collected, the faster a person treads, the more power is outputted, and thus the speed sensor is not applicable to low speed climbing, and the riding effect is poor when climbing.

The new generation sensor system is equipped with a torque sensor; however, the existing torque sensor system is equipped with a strain set or a strain gauge structure, which collects the torque data through checking the deformation of a middle shaft under treading; as the processing of the strain set is relatively complex, it is hard to meet the consistency, and the processing cost is high. Therefore, in respect of the existing torque sensor system, it is necessary to reduce the cost and increase the reliability of the torque signal.

SUMMARY OF THE PRESENT INVENTION

To solve the above defects of the existing technology, the present invention provides a torque sensor system for a pedelec.

According to the present invention, the torque sensor system for the pedelec comprises an annular gear, a planetary gear train, a sun gear output shaft, a pressure conversion device and a signal processing component which are engaged in turn; for the annular gear and the planetary gear train, one acts as a power input unit, and the other acts as a power output unit; the pressure conversion device is for receiving a first applied force generated by the power output unit and then converting the first applied force to a second applied force based on a lever principle; and, the signal processing component is for measuring a performance of the second applied force, converting measuring results thereof to an electric signal, and outputting the electric signal.

Preferably, the pressure conversion device comprises a rocker, a return spring and a locating pin, wherein the locating pin serves as a pivot of the rocker; a first end of the rocker is matched with the power output unit, and a second end of the rocker is matched with the return spring.

Preferably, the pressure conversion device further comprises a limiting structure, wherein the limiting structure is set at a steering direction of the rocker driven by the return spring, for limiting a displacement of the rocker.

Preferably, the first end of the rocker is engaged with the power output unit, wherein the first applied force of the power output unit acts on the first end of the rocker under a torque, and then the rocker transmits the torque to the second end of the rocker with the locating pin as the pivot.

Preferably, the first applied force is reduced to the second applied force by the rocker based on the lever principle, and then the second applied force acts on the return spring.

Preferably, the signal processing component is a force sensing resistor or a Hall element;

when the signal processing component is the force sensing resistor, the second applied force is applied on the return spring by the second end of the rocker, then the return spring transmits the second applied force to the force sensing resistor, and finally the force sensing resistor converts the second applied force to the electric signal; and when the signal processing component is the Hall element, the second applied force is applied on the return spring by the second end of the rocker, so as to generate the displacement, and then the Hall element converts the displacement to a displacement signal; wherein the Hall element is arranged on the rocker and in a middle of two isotropic magnets.

Preferably, the annular gear acts as the power output unit, and the planetary gear train acts as the power input unit, wherein the annular gear is driven by the planetary gear train.

Preferably, the torque sensor system further comprises a fixed support, for holding the annular gear, the planetary gear train and the signal processing component, and the first end of the rocker is matched with an edge of the annular gear.

Preferably, the annular gear acts as the power input unit, and the planetary gear train acts as the power output unit; and the first end of the rocker is matched with a planetary support edge of the planetary gear train.

Compared with the existing technology, the present invention has following beneficial effects.

1. The structure of the torque sensor system is more compact, and the torque transmission signal between the planetary gear train and the annular gear is stable and reliable.

2. The rocker controls the force sensing resistor or the Hall element to convert the pressure signal, thereby replacing the strain set and the strain gauge, which can reduce the production cost and increase the consistency of the signal.

3. The torque sensor system effectively solves the problem of the pedelec that the power output is dependent on the treading pressure when climbing.

4. The torque sensor system can be widely applied in different mechanical drive structures, widening its application ranges.

5. The user will have more real riding experience and will feel more comfortable when using the pedelec with the torque sensor system.

BRIEF DESCRIPTION OF THE DRAWINGS

The present invention will now be described by referring to the accompanying drawings that illustrate the non-restrictive embodiments of the present invention, so that other features, objects and advantages of the present invention will be evident.

Figure 1:
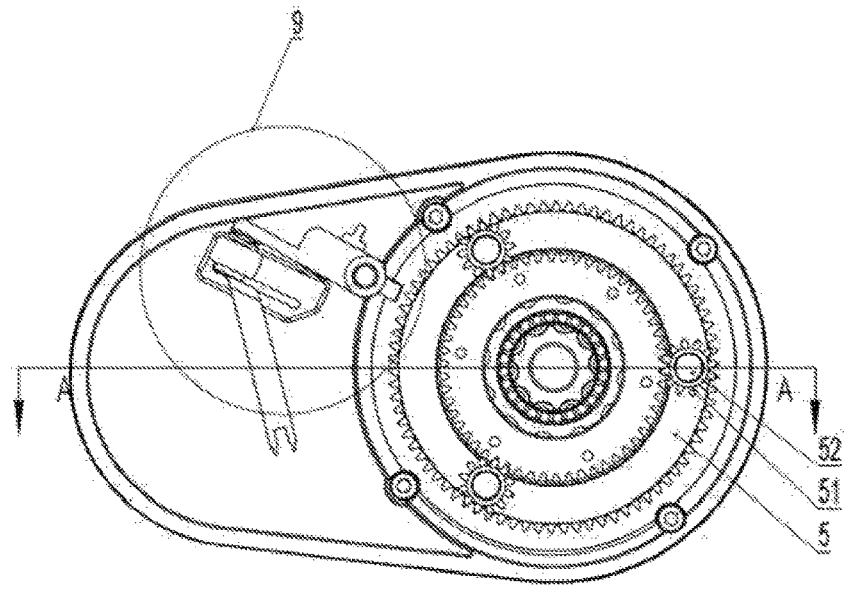
FIG. 1 is a front view of a torque sensor system for a pedelec according to a first preferred embodiment of the present invention.
Figure 2:
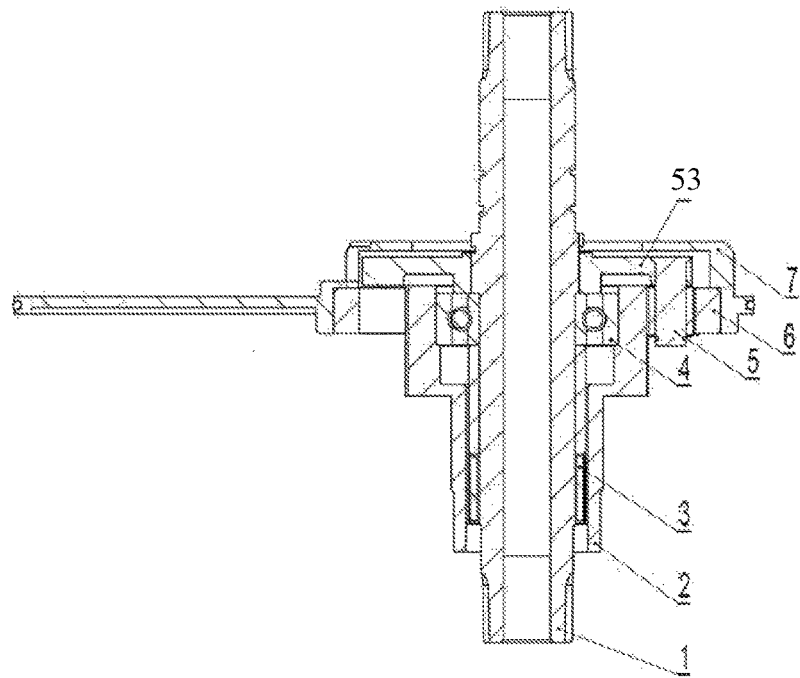
FIG. 2 is an A-A sectional view of the torque sensor system according to the first preferred embodiment of the present invention.

In figures: 1: middle shaft; 2: sun gear output shaft; 3: first bearing; 4: second bearing; 5: planetary gear train; 51: planetary gear; 52: planetary pin; 53: planetary support; 6: annular gear; 7: fixed support; 8: signal processing component; 9: pressure conversion device; 71: limiting structure; 91: locating pin; 92: rocker; 93: return spring; 10: pressure conversion device; 101: locating pin; 102: rocker; 103: return spring; 104: signal magnetic steel; 105: Hall element; and 106: fixed support.

DETAILED DESCRIPTION OF THE PREFERRED EMBODIMENT

A further detailed description will be provided for the present invention in combination of the preferred embodiments. The following preferred embodiments will help the person skilled in the art further understand the present invention, but will not limit the present invention in any form. It is noted that the person skilled in the art can fulfill several transformations and promotions on the premise of the conception of the present invention, and the transformations and promotions belong to the protection scope of the present invention.

As shown in FIG. 1 to FIG. 4, according to a first preferred embodiment of the present invention, a torque sensor system for a pedelec comprises a middle shaft 1, a planetary gear train 5, a sun gear output shaft 2, an annular gear 6, a pressure conversion device 9, a signal processing component 8 and a fixed support 7. The middle shaft 1 serves as an input shaft, which is fixed with a planetary support 53 of the planetary gear train 5 through a spline structure, and the planetary gear train 5 is driven by the middle shaft 1; a relative movement exists between the planetary gear train 5 and the sun gear output shaft 2; a torque signal acting on the middle shaft 1 is converted to a pressure signal by the annular gear 6 combined with the pressure conversion device 9, and the pressure signal is converted to an electric signal and then transmitted to a controller by the signal processing component 8; and finally, a torque feedback is achieved.

A limiting structure 71 is arranged on the fixed support 7, for restricting a displacement of the pressure conversion device 9, so that a rocker 92 can accurately return back to an original position under an action of a return spring 93. The rocker 92 shifts between a reset position and a stressing position; at the reset position, the rocker 92 is against by the limiting structure, while at the stressing position, the rocker 92 is kept away from the limiting structure, and a gap is generated between the rocker 92 and the limiting structure.

Figure 3:
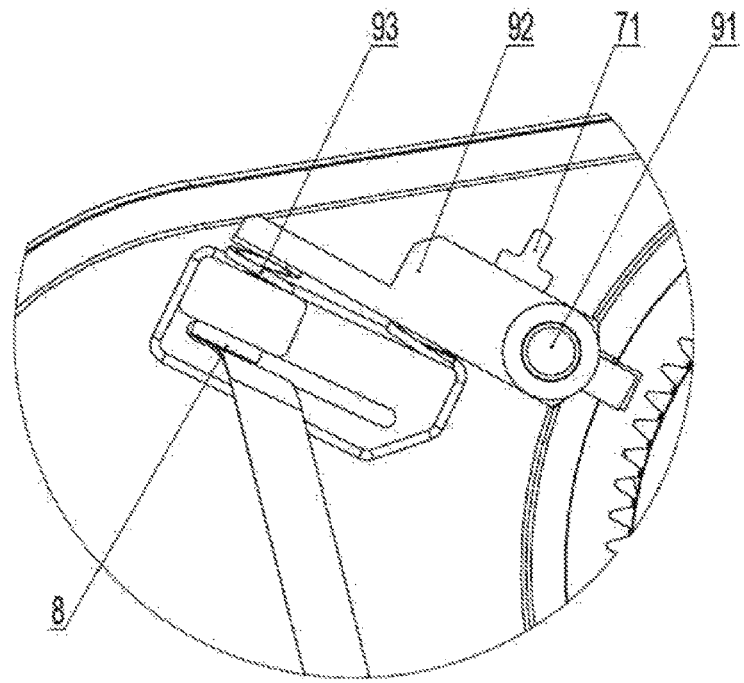
FIG. 3 is a partial enlarged view of a pressure conversion device according to the first preferred embodiment of the present invention.

In FIG. 3, a block serves as the limiting structure is located at a power output arm side of the rocker. Alternatively, the block is located at a power input arm side of the rocker, or two blocks are respectively located at the power input arm side and the power output arm side.

The middle shaft 1 and the planetary gear train 5 are fixed together; the middle shaft 1 and the sun gear output shaft 2 are assembled together through a first bearing 3 and a second bearing 4, and the middle shaft serves as a torque input shaft.

The planetary gear train 5 comprises planetary gears 51, planetary pins 52 and the planetary support 53, wherein the planetary support 53 is connected to the middle shaft 1 through the spline structure. The planetary gears 51 are linked with the planetary support 53 via the planetary pins 52; the planetary support 53 rotates along with the middle shaft 1, and the planetary gears 51 on the planetary support 53 rotate relatively to the sun gear output shaft 2.

The pressure conversion device 9 comprises a locating pin 91, the rocker 92 and the return spring 93; wherein the locating pin 91 serves as a pivot of the rocker 92; a first end and a second end of the rocker 92 are respectively matched with the annular gear 6 and the return spring 93; and an applied force of the annular gear 6, namely a first applied force, is reduced in a certain percentage based on a lever principle and then acts on the signal processing component 8.

As shown in FIG. 3, the signal processing component 8 is a force sensing resistor, which directly detects a pressure and then converts the pressure signal to the electric signal. Specifically, a second applied force, namely the reduced first applied force based on the lever principle, is applied on the return spring by the second end of the rocker, then transmitted to the force sensing resistor by the return spring, and finally converted to the electric signal by the force sensing resistor.

Figure 4:
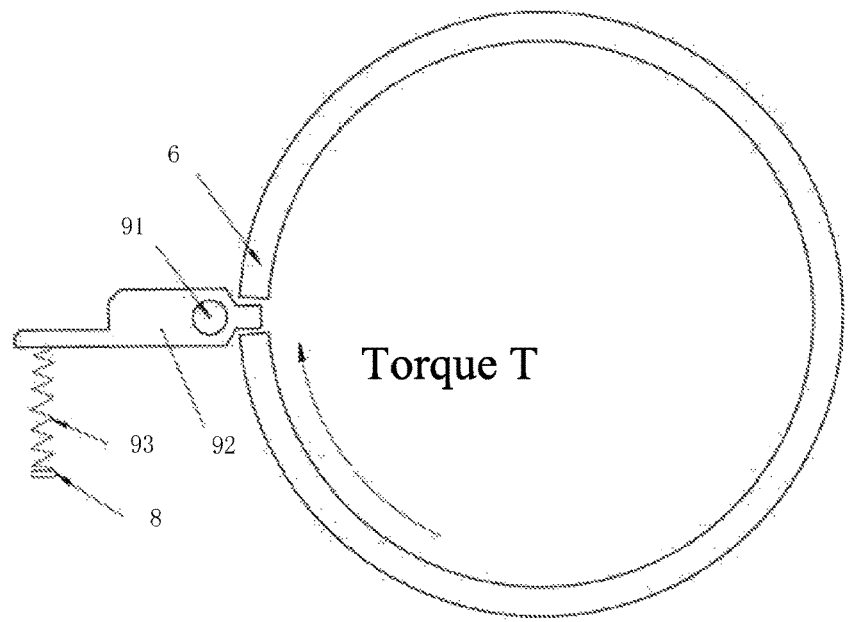
FIG. 4 is a schematic diagram of the pressure conversion device according to the first preferred embodiment of the present invention.
Figure 5:
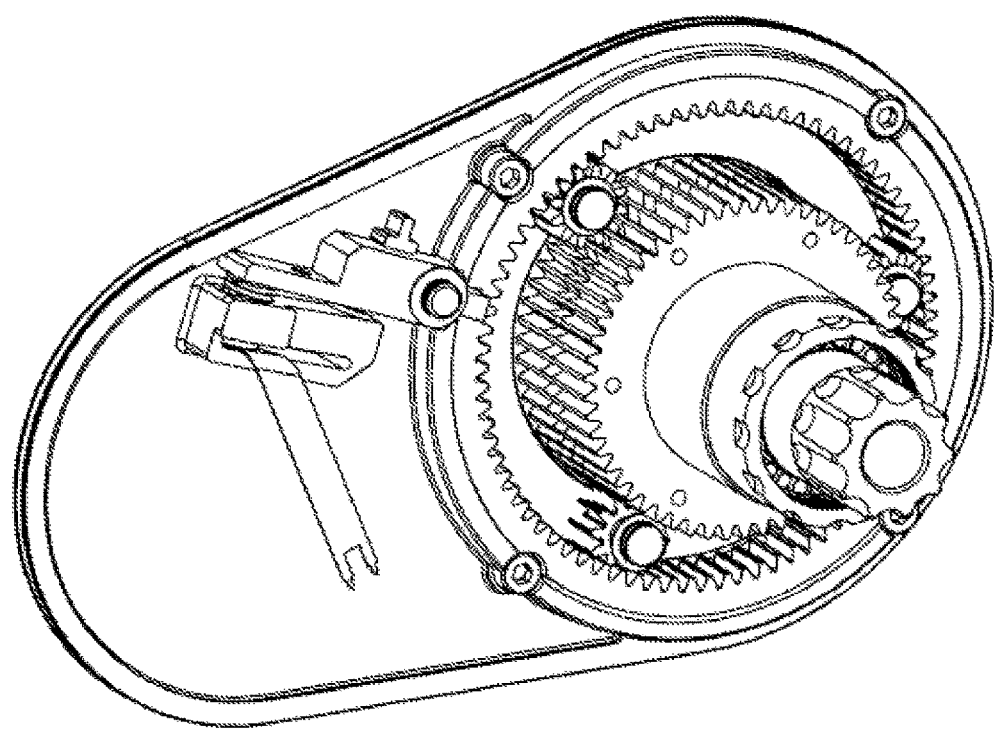
FIG. 5 is a structural sketch view of the torque sensor system according to the first preferred embodiment of the present invention.

FIG. 4 is a schematic diagram of the pressure conversion device of the torque sensor system provided by the first preferred embodiment of the present invention. In FIG. 4, the first end of the rocker 92 is engaged with the annular gear 6, and when the annular gear is under an action of a torque, the torque drives the first end of the rocker 92 to rotate with the locating pin 91 as the pivot; after the first applied force is reduced based on the lever principle, the second end of the rocker 92 applies the second applied force on the return spring 93, and the return spring transfers the pressure to the force sensing resistor. Preferably, the annular gear 6 has a notch, so that the first end of the rocker 92 stretches into the notch for engaging. FIG. 5 is a structural sketch view of the torque sensor system according to the first preferred embodiment of the present invention.

Figure 6:
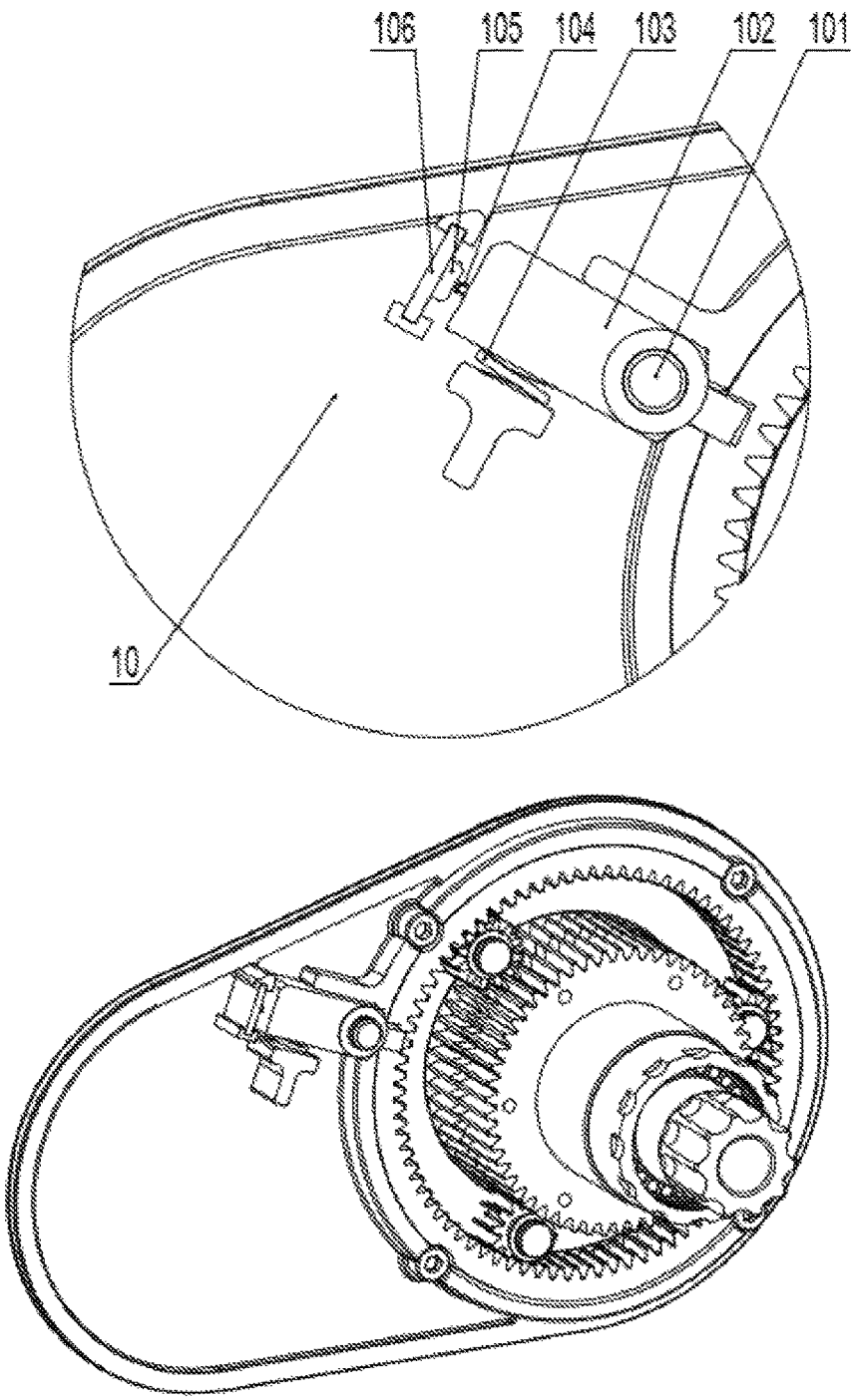
FIG. 6 is a structural sketch view of a torque sensor system with a signal processing component being a Hall element according to a second preferred embodiment of the present invention.

FIG. 6 shows a second preferred embodiment of the present invention, and the person skilled in the art can consider the second preferred embodiment as a modification of the first preferred embodiment. The second preferred embodiment is different from the first preferred embodiment in that: the pressure conversion device 10 comprises a locating pin 101, a rocker 102, a return spring 103, a signal magnetic steel 104, a Hall element 105 and a fixed support 106. The signal processing component is the Hall element 105; a principle of the Hall element is displacement detection; in case of a definite structure, a linear relation exists between the torque and a displacement of the rocker 102, then a displacement signal of the rocker 102 is converted to the electric signal through the Hall element 105, and a torque detection is thereby realized indirectly. Specifically, the second end of the rocker 102 applies the second applied force on the return spring 103, so as to generate the displacement, and then the Hall element 105 converts the displacement to the displacement signal; wherein the Hall element 105 is arranged on the fixed support 106, and the signal magnetic steel 104 is arranged on the rocker 102. When the rocker 102 moves, the signal magnetic steel 104 is driven to generate a relative displacement with the Hall element 105, and, as a consequence, an electromotive force is accordingly generated, which will be transmitted to the controller after processing, so as to realize the torque feedback. Preferably, the reset position serves as a null position of the electromotive force.

In conclusion, the present invention provides a torque sensor system with lower cost and more reliable signal and a pedelec with more real and comfortable riding experience.

The preferred embodiments of the present invention are described above. It is noted that the present invention is not limited to the embodiments, and the person skilled in the art can make various transformations and changes within the scope of claims, which will not affect the essential contents of the present invention.

What is claimed is:

1. A torque sensor system for a pedelec, comprising an annular gear, a planetary gear train, and a sun gear output shaft which are engaged in turn, and further comprising a pressure conversion device and a signal processing component; wherein:
    for the annular gear and the planetary gear train, one acts as a power input unit, and the other acts as a power output unit;
    the pressure conversion device is for receiving a first applied force generated by the power output unit and then converting the first applied force to a second applied force based on a lever principle; and
    the signal processing component is for measuring a performance of the second applied force, converting measuring results thereof to an electric signal, and outputting the electric signal.

2. The torque sensor system for the pedelec, as recited in claim 1, wherein the pressure conversion device comprises a rocker, a return spring and a locating pin; the locating pin serves as a pivot of the rocker; a first end of the rocker is matched with the power output unit, and a second end of the rocker is matched with the return spring.

3. The torque sensor system for the pedelec, as recited in claim 2, wherein the pressure conversion device further comprises a limiting structure which is set at a steering direction of the rocker driven by the return spring, for limiting a displacement of the rocker.

4. The torque sensor system for the pedelec, as recited in claim 2, wherein the first end of the rocker is engaged with the power output unit; the first applied force of the power output unit acts on the first end of the rocker under a torque, and then the rocker transmits the torque to the second end of the rocker with the locating pin as the pivot.

5. The torque sensor system for the pedelec, as recited in claim 2, wherein the first applied force is reduced to the second applied force by the rocker based on the lever principle, and then the second applied force acts on the return spring.

6. The torque sensor system for the pedelec, as recited in claim 2, wherein: the signal processing component is a force sensing resistor or a Hall element;
    when the signal processing component is the force sensing resistor, the second applied force is applied on the return spring by the second end of the rocker, then the return spring transmits the second applied force to the force sensing resistor, and finally the force sensing resistor converts the second applied force to the electric signal; and
    when the signal processing component is the Hall element, the second applied force is applied on the return spring by the second end of the rocker, so as to generate a displacement, and then the Hall element converts the displacement to a displacement signal; wherein the Hall element is arranged on the rocker and in the middle of two isotropic magnets.

7. The torque sensor system for the pedelec, as recited in claim 6, wherein the annular gear acts as the power output unit, and the planetary gear train acts as the power input unit; and the annular gear is driven by the planetary gear train.

8. The torque sensor system for the pedelec, as recited in claim 6, wherein the torque sensor system further comprises a fixed support for holding the annular gear, the planetary gear train and the signal processing component; and the first end of the rocker is matched with an edge of the annular gear.

9. The torque sensor system for the pedelec, as recited in claim 6, wherein the annular gear acts as the power input unit, and the planetary gear train acts as the power output unit; and the first end of the rocker is matched with an edge of a planetary support of the planetary gear train.

* * * * *